United States Patent
Janowitz et al.

(10) Patent No.: US 7,226,885 B2
(45) Date of Patent: Jun. 5, 2007

(54) METHOD FOR PRODUCING GAS DIFFUSION ELECTRODES

(75) Inventors: Kosmas Janowitz, Dortmund (DE); Torsten Dresel, Hagen (DE); Peter Woltering, Neuenkirchen (DE); Roland Beckmann, Lünen (DE); Thomas Steinmetz, Dortmund (DE); Randolf Kiefer, Bochum (DE); Karl-Heinz Dulle, Olfen (DE); Frank Funck, Mülheim (DE); Hans-Joachim Kohnke, Kassel (DE)

(73) Assignees: Uhde GmbH, Dortmund (DE); Gaskatel GmbH, Kassel (DE)

( * ) Notice: Subject to any disclaimer, the term of this patent is extended or adjusted under 35 U.S.C. 154(b) by 586 days.

(21) Appl. No.: 10/481,775

(22) PCT Filed: Jun. 18, 2002

(86) PCT No.: PCT/EP02/06706

§ 371 (c)(1),
(2), (4) Date: Dec. 22, 2003

(87) PCT Pub. No.: WO03/004726

PCT Pub. Date: Jan. 16, 2003

(65) Prior Publication Data

US 2004/0152588 A1    Aug. 5, 2004

(30) Foreign Application Priority Data

Jun. 23, 2001    (DE)    ............................ 101 30 441

(51) Int. Cl.
    *H01M 2/14*    (2006.01)

(52) U.S. Cl. .................................. 502/101; 429/42

(58) Field of Classification Search ................ 502/101; 429/40, 41, 42, 140, 141, 133
See application file for complete search history.

(56) References Cited

U.S. PATENT DOCUMENTS

| 3,502,509 | A | * | 3/1970 | Sindorf ...................... 502/101 |
| 3,505,129 | A |   | 4/1970 | Burstein et al. |
| 3,553,032 | A | * | 1/1971 | Baba et al. ................. 264/109 |
| 3,668,101 | A | * | 6/1972 | Bergman .................... 204/415 |

(Continued)

FOREIGN PATENT DOCUMENTS

DE    1546728    10/1970

(Continued)

*Primary Examiner*—David R. Sample
*Assistant Examiner*—Abraham M. Matthews
(74) *Attorney, Agent, or Firm*—Collard & Roe, P.C.

(57) ABSTRACT

With the help of a method for production of a gaseous diffusion electrode from a silver catalyst on PTFE-substrate, it is endeavored to achieve results which can be reproduced, by avoiding the disadvantages of the state-of-the-art technology, whereby this is achieved in that

Figure 1:
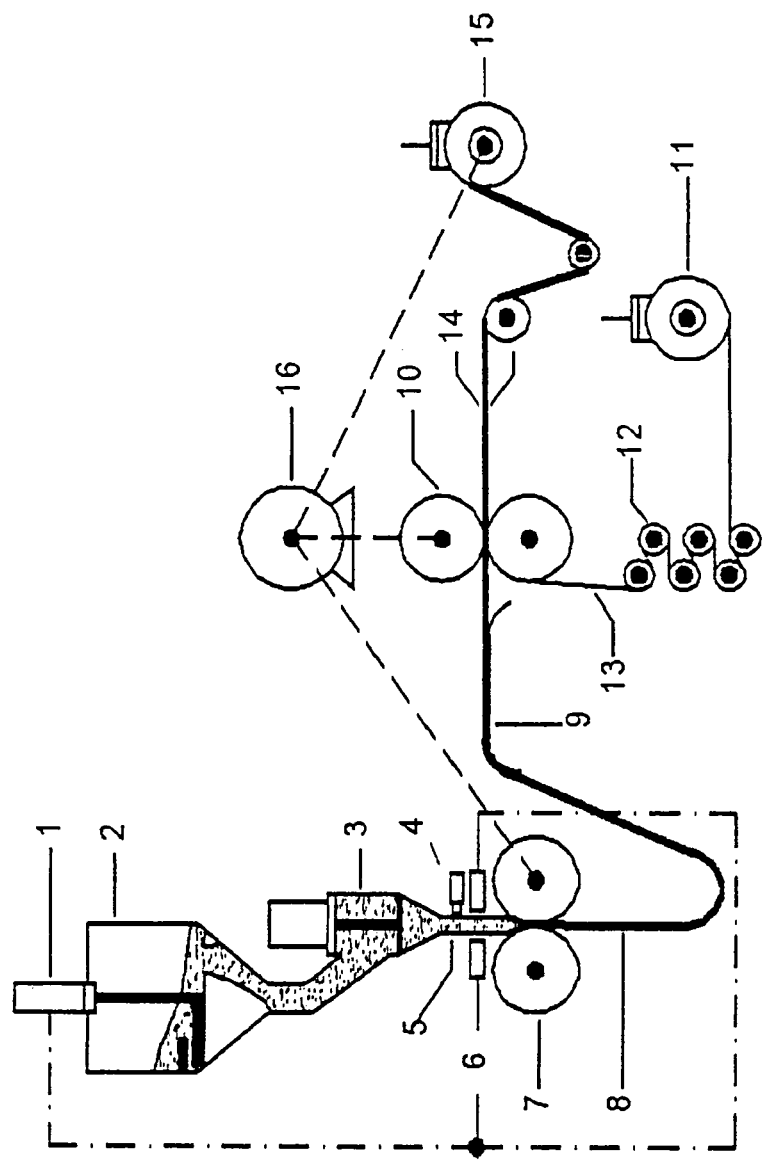

- the porous system of the silver catalyst is filled with a wetted fluid;
- a dimension-stable solid body with a grain size above that of the silver catalyst is mixed below the silver catalyst;
- the thus compression-stable mass is shaped into a homogenous catalyst band in a calender; and
- in a second calender step, an electrically conductive conductor material is imprinted into the catalyst band.

12 Claims, 5 Drawing Sheets

1 Rotary Slide Valve
2 Storage Container
3 Crusher (Hammer Mill)
4 Powder Funnel
5 Knocker
6 Light Barrier
7 Web Roll
8 Electrode Web
9 Guide Rail
10 Net Roll
11 Net Roller
12 Guide Roller
13 Conductive Net
14 Edge Stripper
15 Spool for Electrode Band
16 Drive Motor

U.S. PATENT DOCUMENTS

| | | | | |
|---|---|---|---|---|
| 3,930,094 A | * | 12/1975 | Sampson et al. | 442/365 |
| 4,357,262 A | * | 11/1982 | Solomon | 502/101 |
| 4,370,284 A | * | 1/1983 | Solomon | 264/42 |
| 4,500,647 A | * | 2/1985 | Solomon | 502/101 |
| 4,518,705 A | * | 5/1985 | Solomon et al. | 502/101 |
| 4,568,442 A | * | 2/1986 | Goldsmith | 204/284 |
| 4,585,711 A | * | 4/1986 | Vaidyanathan | 429/42 |
| 4,603,118 A | | 7/1986 | Staab | |
| 4,696,872 A | | 9/1987 | Blanchart et al. | |
| 4,931,168 A | * | 6/1990 | Watanabe et al. | 204/284 |
| 5,364,712 A | | 11/1994 | Townsend | |
| 2004/0152588 A1 | * | 8/2004 | Janowitz et al. | 502/101 |

FOREIGN PATENT DOCUMENTS

| | | |
|---|---|---|
| DE | 2021009 | 2/1971 |
| DE | 3710168 | 10/1988 |
| EP | 0115845 | 8/1984 |
| EP | 0144002 | 6/1985 |

* cited by examiner

1 Rotary Slide Valve
2 Storage Container
3 Crusher (Hammer Mill)
4 Powder Funnel
5 Knocker
6 Light Barrier
7 Web Roll
8 Electrode Web
9 Guide Rail
10 Net Roll
11 Net Roller
12 Guide Roller
13 Conductive Net
14 Edge Stripper
15 Spool for Electrode Band
16 Drive Motor

FIG. 2    Silver electrode before use
FIG. 3    Silver electrode after use

METHOD FOR PRODUCING GAS DIFFUSION ELECTRODES

CROSS REFERENCE TO RELATED APPLICATIONS

Applicants claim priority under 35 U.S.C. §119 of German Application No. 101 30 441.2 filed Jun. 23, 2001. Applicants also claim priority under 35 U.S.C. §365 of PCT/EP02/06706 filed Jun. 18, 2002. The international application under PCT article 21(2) was not published in English.

This invention pertains to a method for manufacturing porous gaseous diffusion electrodes of the generic type mentioned in claim 1. Such a gaseous diffusion electrode can, for example, be based on a catalytic active silver or silver alloys for use in electro-chemical cells, particularly of choloro-alkaline electrolysis, or alkaline fuel cells.

In electro-chemical cells, the reduction of oxygen is carried out on platinum, silver or even carbon. Platinum can be used in acidic as well as in alkaline surroundings, whereas silver and carbon are stable against corrosion only in alkaline electrolytes. However, in case of silver catalyst, even in alkaline mediums rapid deactivation occurs, which can be explained due to rearrangement of the oxidic surface of the silver. (Texas Instruments, U.S. Pat. No. 3,505,129). It has been tried several times to reduce the corrosive attack of silver alloying partners. Thereby one knows of alloys with precious material like platinum, paladium, gold and mercury (DE 20 21 009), or even with non-precious substances like nickel (DE 15 46 728), copper and other materials. It has also been attempted to achieve a stabilisation of the silver by means of refining or also with the help of anodic corrosion protection (local elements). In case of corrosion, initially a silver oxide surface is formed. As silver oxide is relatively well soluble in lye solutions, a rearrangement of silver crystals can take place. In FIGS. 2 and 3, REM-images of silver electrodes before and after operation have been depicted. One can very clearly identify the reduction of the inner porous structure. The catalytic activity gets reduced.

Apart from stabilisation, a method of manufacture of an active silver catalyst must also ensure that the active surface of the silver is sufficiently large, i.e. the grain size of the silver should be as small as possible. Thus, for example, from the document (U.S. Pat. No. 3,668,101) it is known that very active silver catalysts can be attained with particle diameters of 5 to 10 μm.

We also know of further methods, in which it has been attempted to manufacture the smallest particles of stable silver alloys. Adequately small silver particles are generated through precipitation procedures. Apart from controlling the pH-value, the temperature and the over-saturation, so-called crystallisation germs play an excellent role in manufacturing the smallest silver particles. We know of a method (EP 0 115 845), in which a mixture of silver nitrate and mercury nitrate are precipitated on a PTFE-dispersion by adding potash lye. In this way, a silver amalgam with smallest particle diameter is produced.

In order to produce so called gaseous diffusion electrodes from these catalysts, as required in fuel cells or in chloro-alkaline electrolysis, the powder should be processed to a homogeneous, flat electrode. This electrode must be electrically conductive and allow the entry of the electrolyte as well as the gas. It must be possible to wet some parts of the electrode, whereas the other parts must be protected from wetting. A solution to this problem was presented with the help of a bi-porous pore structure. Initially the electrolyte can penetrate without any trouble into the small as well as the large pores. By means of an over-pressure of the gas or by gravitational force, the electrolyte is again removed from the larger pores. Such bi-porous structures work satisfactorily only when there is a pressure difference between the gaseous chamber and the electrolyte chamber. Whether such pressure differences can be created, if in the electrolytes a membrane separates the anode and the cathode from one another, is doubtful. Thus, these electrodes can not be used in chloro-alkaline electrolysis or in fuel cells with alkaline membranes.

Hence it was attempted to create a bi-porous pore system with the help of material properties. This means one requires hydrophilic and hydrophobic materials. Suitable hydrophobic materials are some thermoplasts—e.g. polytetraflouroethylene. The mentioned catalysts and also the silver are always hydrophilic. Therefore, if one mixes silver and PTFE together and creates a plane electrode from that, then this could have different regions with hydrophilic and hydrophobic properties. Mostly an additional metal conductor is integrated, in order to achieve better electrical properties.

We know of a new method of producing a so-called gaseous diffusion electrode from mixtures of PTFE (Polytetraflouroethylene) and catalyst. Thus for example, in the document (EP 0 115 845) it is suggested that the materials be suspended in such a manner, that one obtains a paste which can be cast, pressed and dried to a particular shape. The disadvantage in case of such "pastisised" electrodes is the non-homogeneous distribution of the materials—there could easily be small holes through which then gas or electrolyte can penetrate. In order to avoid this, the electrodes are manufactured with at least 0.8 mm thickness. In this way, there are also huge silver quantities in the electrodes (around 2 Kg/m$^2$), so that the price advantage of silver is again lost. Because, we already know of commercial oxygen electrodes with approx. 4–40 gm/m$^2$ of platinum/carbon.

Figure 5:
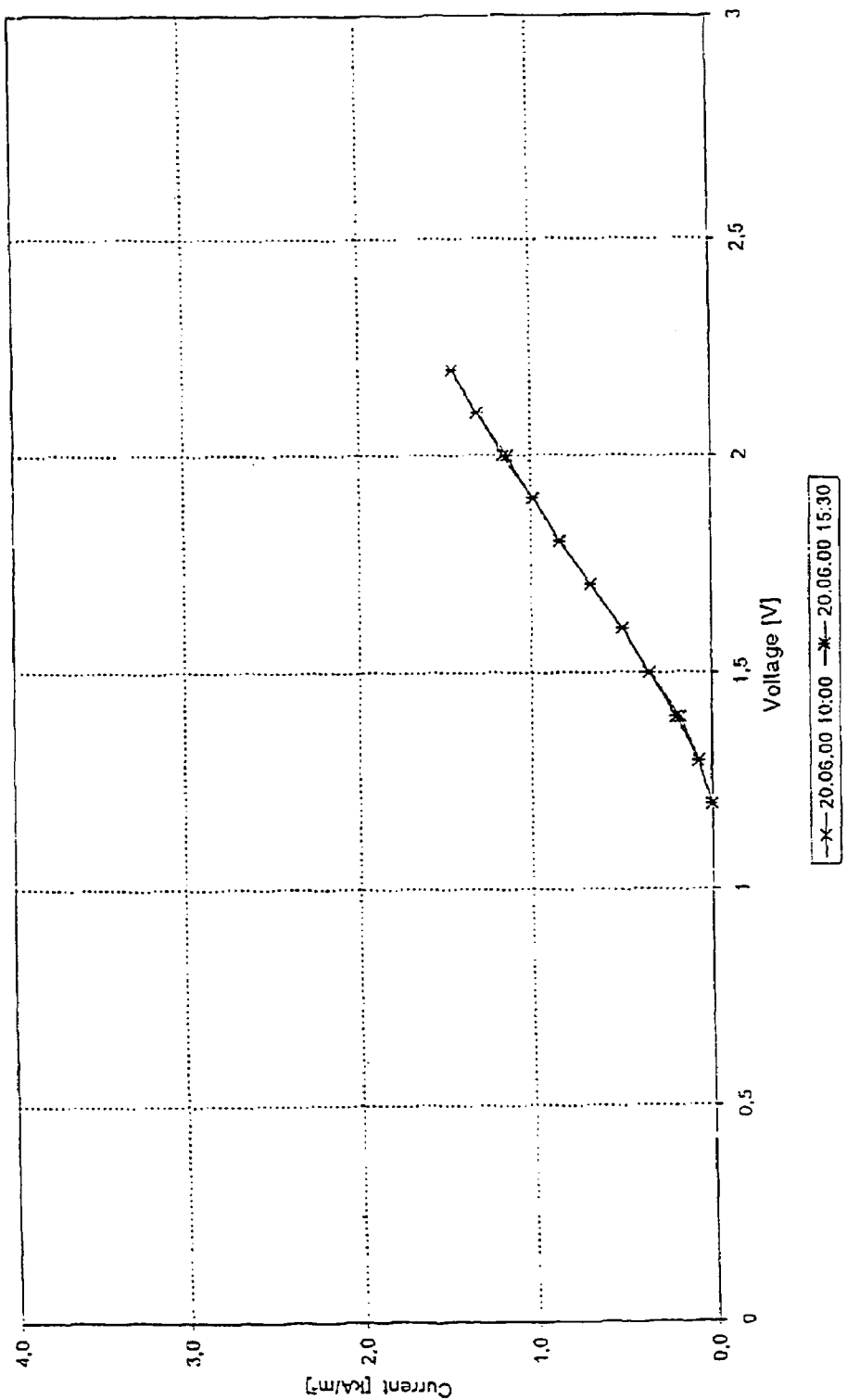

Two methods are known, in which from such hydrophobic/hydrophilic materials a thin, homogeneous gaseous diffusion electrode is rolled. According to the method (EP 0 144 002, U.S. Pat. No. 4,696,872), the catalyst particles and the PTFE are mixed in a special mixer in such a way, that a fine-meshed hydrophobic net system gets precipitated on the catalyst. The loose mass is then rolled together in a powder roller to form a foil of approx. 0.2 mm thickness. This method has proved useful for mixtures with PTFE and carbon, or PTFE and Raney-nickel. It is similarly possible to in this way roll a Raney-silver-alloy with 80% aluminum into a porous foil. FIG. 1 shows such a calender rolling mechanism. However, it is not possible to process the ductile silver. In case of the required pressing pressure—approx. 0.01 to 0.6 t/cm$^2$—in such powder rollers, PTFE and silver are pressed to form a compact, gas-impermeable and electrolyte-impermeable foil. The current-voltage graph for such an electrode is shown in FIG. 5.

In order to nevertheless be able to produce silver electrodes, initially a silver oxide/PTFE-mixture is processed in the powder roller and subsequently reduced electro-chemically (DE 37 10 168). The silver oxide is stable enough to withstand the pressing pressure of the roller. Besides, the volume reduces on transition from silver oxide to silver, so that additional pores are generated in the gaseous diffusion electrodes. By means of the parameters during reduction, the grain size of the particles can be very well adjusted. The disadvantage of this method is, that it is not yet known, how silver alloys with catalytic properties can be reduced electro-chemically. Hence it is not possible to produce durable, stable silver electrodes by means of electro-chemical reduction.

The task of this invention is to present a method for producing a gaseous diffusion electrode, with which not only the disadvantages of the state-of-the-art technology can be avoided, but also to particularly evolve results in the process product which can be reproduced.

With the help of the method already mentioned above, this task is fulfilled according to the invention, in that
  The porous system of the silver catalyst is filled with a wetting fluid;
  a dimension-stable solid body with a grain size above that of the silver catalyst mixed below the silver catalyst;
  the thus formed compression-stable mass is shaped in a calender to a homogeneous catalyst band; and
  in a second calender step, an electrically conducting material is imprinted in the catalyst band.

The speciality of this method as per the invention lies therein, that the inner porous system of the ductile material is filled with a fluid. As this fluid cannot be solidified and, on the other hand, is fixed in the porous system by means of the capillary forces, the fluid cannot be removed from the micro-pores even at a pressure of maximum 600 kg/cm$^2$. Further addition of a little powder carbon or the volatile ammonium carbonate can take up the mechanical pressure of the powder roller even further. By means of these coarse-grained additions of typically 10–100 μm grain diameter, the porous system with larger pore diameter is protected from solidification. By means of a subsequent annealing step, the fluid as well as the ammonium carbonate can be driven out of the electrode. In this way, one can obtain large pores in the gaseous diffusion electrode, which ensures rapid gas transportation and smaller pores in the catalyst, which allow a homogeneous optimum utilisation of the catalyst.

A preferred execution of this method is depicted as follows:
first, silver or a silver alloy is produced by means of a precipitation process. Thereby, it would be advantageous to carry out the precipitation on a PTFE-dispersion. The best experiences are made with a mixture of 15% teflon and 85% silver. By addition of formaldehyde during precipitation, the silver hydroxide immediately gets transformed in the alkaline surroundings into a silver crystal. The precipitate mass is washed and dried. Subsequent annealing at 200° C. improves the electrical contact between the silver particles and drives out the remaining fluids.

A quantity of about 5%-40%, preferably however 8%, of a fluid is added to this powder. This fluid can penetrate into the porous system of the PTFE and the silver. On account of the hydrophobic character of the PTFE, only isopropanol, ethanol and methanol will come into consideration. If the powder is wetted and filled with such solvents, then there could subsequently be an exchange of the fluids. For example, one can bring a powder immersed in isopropanol into a water bath, or glycerine, and thus within hours the fluids get exchanged through diffusion. In this way, fluid enters into the porous system of the PTFE, which is generally repelled by the PTFE. The thus moistened material behaves externally like a powder because the fluid is present in the inner porous system.

Figure 4:
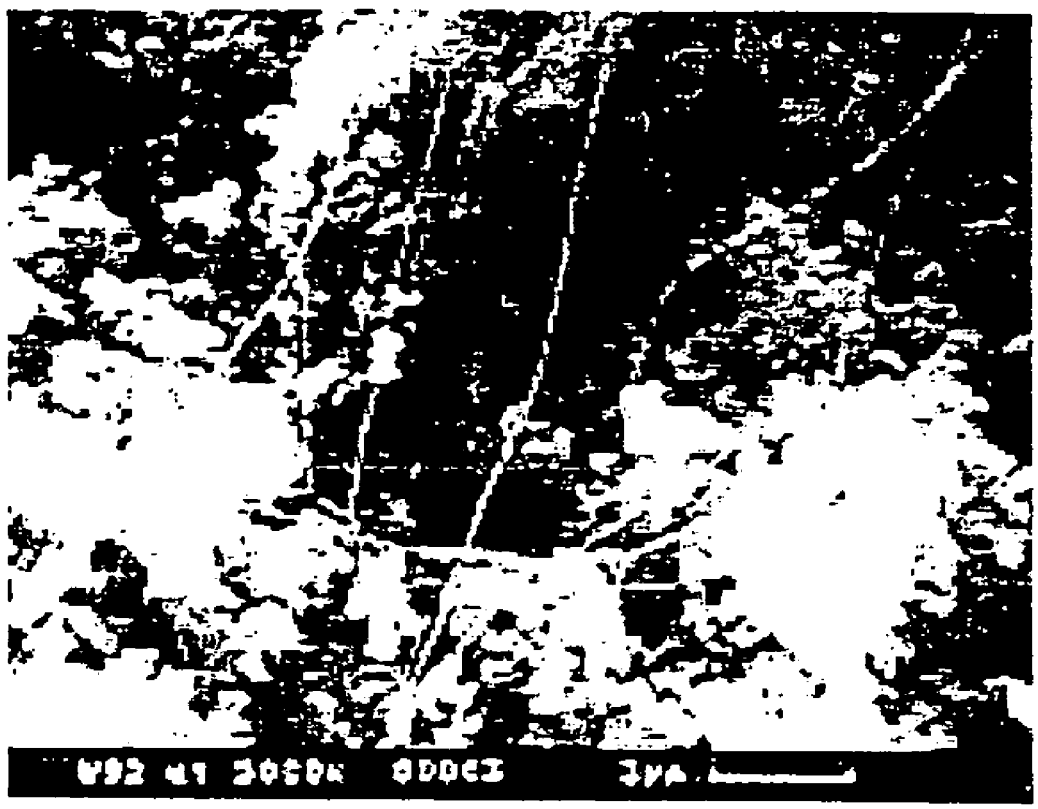

Another generic type of wetting agent would be the so-called tensides. These penetrate into the porous system, and at the same time also cover the surface of the catalyst, thus reducing its surface roughness. This reduced surface roughness leads during the rolling process to the phenomenon, that the silver catalyst can move away from the solidification zone, whereas other powder components which have not been treated remain in the solidification zone and thus produce the electrode combination in which the silver catalyst is embedded (FIG. 4). Such a powder could be ammonium carbonate or activated carbon, which can now be mixed to a homogeneous mass with the silver catalyst in a pulverizer, as described in EP 0 144 002. Subsequently, the loose mass is rolled into a foil of approx. 0.2 mm thickness by means of a powder roller.

Figure 6:
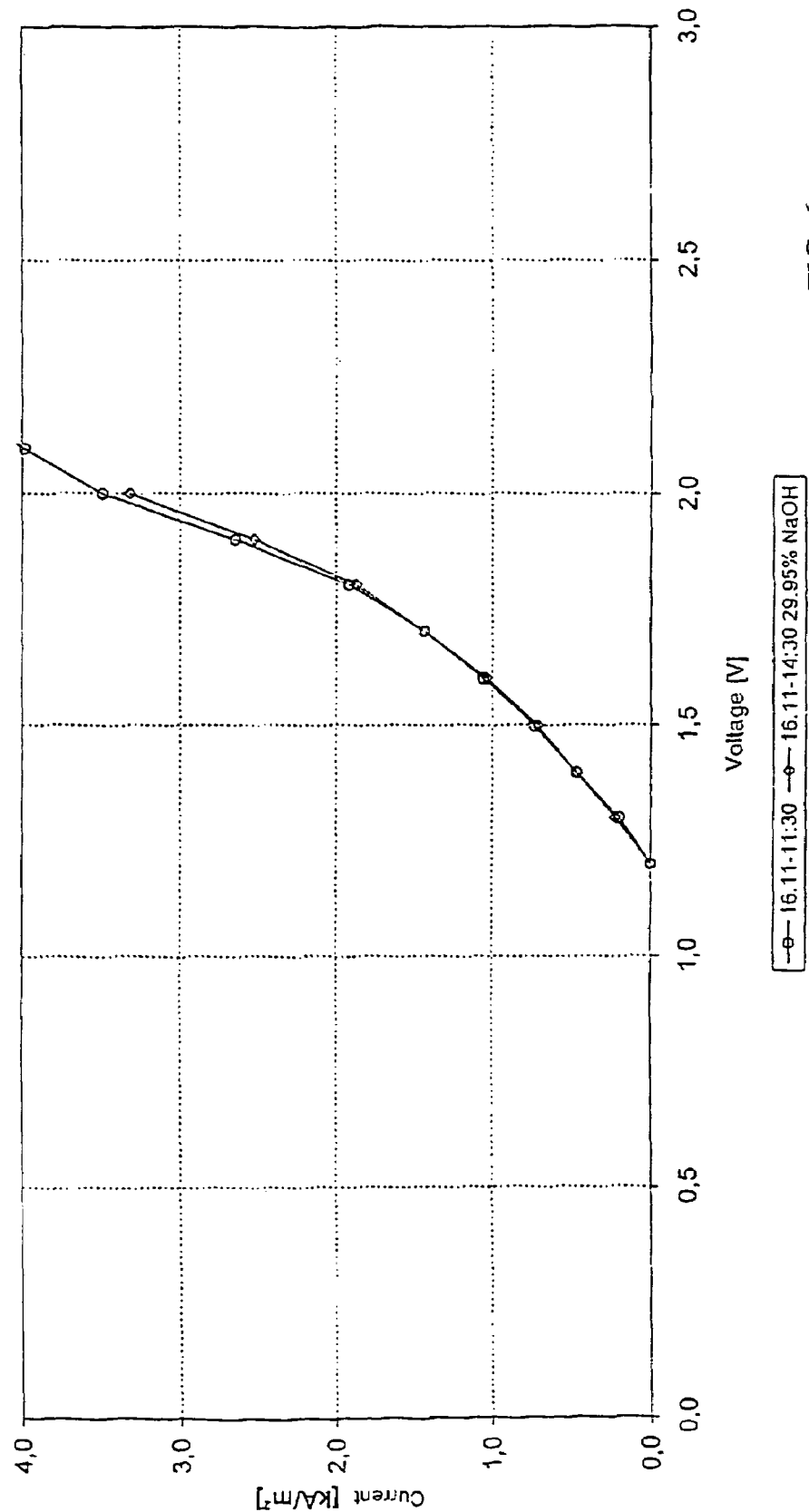

In a second pair of rollers, a metallic support structure can be rolled in the form of woven nets or stretch-metals and thus the mechanical stability and the electrical conductivity can be improved. After this sequence, the gaseous diffusion electrode is dried. Thereafter the electrode has a silver deposit between 0.2 kg/m$^2$ and 1.5 kg/m$^2$. Generally, one endeavours for a weight of approx. 0.5 kg/m$^2$. Thus, up to 75% of the hitherto required silver can be saved. In spite of the reduced silver weight, with such electrodes one obtains a current-voltage-graph as shown in FIG. 6.

Of course, this method can also be combined with others. Thus, one can do away with the environmentally harmful formaldehyde for precipitation and instead carry out the reduction after production of the gaseous diffusion electrodes by means of electro-chemical methods. In this way, one can similarly produce alloys by carrying out a Ko-precipitation of silver and mercury, titan, nickel, copper, cobalt or bismuth.

Especially for the chloro-alkaline-electrolysis, changes can be effected on the ready gaseous diffusion electrode, which would enable improved removal of the occurring soda lye. For this, the imprinting of a coarse conducting system is advisable. This is possible, if a net is pressed on to the ready electrode and then subsequently removed again. The negative impression of the net forms channels, in which the electrolyte can later flow off parallel to the electrode surface.

Further features, details and advantages of the invention are shown in the following diagrams. The following are shown:

FIG. 1 A functional diagram of a device/plant as per the invention;

FIG. 2 A microscopic image of a silver electrode before use;

FIG. 3 In the same depiction form, a silver electrode after use;

FIG. 4 A PTFE-structure embedded in a silver catalyst;

FIG. 5 A current/voltage diagram of a chloro-alkaline electrolysis; and

FIG. 6 The same graph according to the parameters of the invention.

We claim:

1. Method for producing a gaseous diffusion electrode from a silver catalyst on a PTFE-substrate, comprising the steps of:
  filling a porous system of the silver catalyst with a wetting fluid;
  mixing a dimension-stable solid body with a grain size above that of the silver catalyst with the silver catalyst to produce a compression-stable mass;
  shaping the thus obtained compression-stable mass into a homogeneous catalyst band in a calender, and
  in a second calender step, imprinting an electrically conducting material into the catalyst band.

2. Method as per claim 1, comprising
  using as wetting fluid 5% isopropanol and as solid substance 30% ammonium carbonate or ammonium-hydrogen-carbonate and driving both these filling substances out after producing the electrodes by means of an annealing step at preferably 110° C.

3. Method as per claim 1, comprising using as wetting fluid a tenside—preferably 5% triton X 100—, which penetrates into the porous system of the catalyst as well as reduces surface friction, so that the silver catalyst can glide out of a solidification zone and a dimension-stable ammonium carbonate and a PTFE-binder takes up a roller pressure.

4. Method as per claim 1, comprising using in the first calender step, a homogeneous catalyst band of thickness between 0.2–0.5 mm.

5. Method as per claim 1, comprising adjusting a roller gap to 350 μm and setting a roller feed to approx. 2 meters per minute.

6. Method as per claim 1, comprising using as electrical conducting material, a silver-coated nickel wire net with a string thickness of 0.15 mm and mesh width of 0.45 mm with an approx. 10 μm thick silver precipitate.

7. Method for producing a gaseous diffusion electrode from a silver catalyst on a PTFE-substrate, comprising the steps of:

filling a porous system of the silver catalyst with a wetting fluid;

mixing a dimension-stable solid body with a grain size above that of the silver catalyst with the silver catalyst to produce a compression-stable mass;

shaping the thus obtained compression-stable mass into a homogenous catalyst band in a calender, in a second calender step, imprinting an electrically conducting material into the catalyst band; and obtaining said gaseous diffusion electrode having large pores in the gaseous diffusion electrode, which ensures rapid gas transportation and smaller pores in the catalyst, which allow a homogeneous optimum utilisation of the catalyst.

8. Method as per claim 7, comprising using as wetting fluid 5% isopropanol and as solid substance 30% ammonium carbonate or ammonium-hydrogen-carbonate and driving both these filling substances out after producing the electrodes by means of an annealing step at preferably 110° C.

9. Method as per claim 7, comprising using as wetting fluid a tenside—preferably 5% triton X 100—, which penetrates into the porous system of the catalyst as well as reduces surface friction, so that the silver catalyst can glide out of a solidification zone and a dimension-stable ammonium carbonate and a PTFE-binder takes up a roller pressure.

10. Method as per claim 7, comprising using in the first calender step, a homogeneous catalyst band of thickness between 0.2–0.5 mm.

11. Method as per claim 7, comprising adjusting a roller gap to 350 μm and setting a roller feed to approx. 2 meters per minute.

12. Method as per claim 7, comprising using as electrical conducting material, a silver-coated nickel wire net with a string thickness of 0.15 mm and mesh width of 0.45 mm with an approx. 10 μm thick silver precipitate.

\* \* \* \* \*